United States Patent [19]

Ishii

[11] Patent Number: 5,426,628
[45] Date of Patent: Jun. 20, 1995

[54] DRIVE FOR AN OPTICAL INFORMATION RECORDING MEDIUM

[75] Inventor: Koichiro Ishii, Yokosuka, Japan

[73] Assignee: Nikon Corporation, Tokyo, Japan

[21] Appl. No.: 152,920

[22] Filed: Nov. 16, 1993

Related U.S. Application Data

[63] Continuation of Ser. No. 794,866, Nov. 19, 1991, abandoned.

[30] Foreign Application Priority Data

Nov. 28, 1990 [JP] Japan .................................. 2-328219

[51] Int. Cl.$^6$ ............................................. G11B 33/14
[52] U.S. Cl. ................................. 369/77.1; 360/97.02
[58] Field of Search ................... 369/75.1, 77.1, 77.2; 360/97.02, 97.03, 97.04, 99.11

[56] References Cited

U.S. PATENT DOCUMENTS

| | | | |
|---|---|---|---|
| 4,317,146 | 2/1982 | Gervais | 360/97.03 |
| 4,337,491 | 6/1982 | Hasler et al. | 360/99.08 |
| 4,405,136 | 9/1983 | Elsing et al. | 360/97.02 |
| 4,771,412 | 9/1988 | Aihara et al. | 369/75.1 |
| 4,979,062 | 12/1990 | Stefansky et al. | 360/97.02 |
| 4,980,786 | 12/1990 | O'Sullivan et al. | 360/97.03 |
| 5,021,905 | 6/1991 | Sleger | 360/97.02 |
| 5,042,024 | 8/1991 | Kurosawa et al. | 369/75.1 |
| 5,079,655 | 1/1992 | Yagi | 360/97.02 |
| 5,086,422 | 2/1992 | Hagiya et al. | 369/75.1 |
| 5,231,623 | 7/1993 | Kanno et al. | 369/75.2 |
| 5,255,254 | 10/1993 | Watanabe et al. | 369/75.1 |
| 5,301,178 | 4/1994 | Okabe et al. | 369/77.1 |

FOREIGN PATENT DOCUMENTS

01116989 5/1989 Japan .................................. 369/292

*Primary Examiner*—Stuart S. Levy
*Assistant Examiner*—Paul J. Ditmyer
*Attorney, Agent, or Firm*—Shapiro and Shapiro

[57] ABSTRACT

A drive for an optical information recording medium comprises a medium holder for holding the optical information recording medium, a drive mechanism for driving the medium, a movable optical head for radiating a light beam to the medium, a body having the drive mechanism and the optical head built therein, a cooling air inlet port formed in the body, and a fan provided in the body for venting the interior of the body. A sealed box having a medium insertion port with a door is provided in the body. The box accommodates no heat generating component and accommodates at least the medium holder and the optical head.

3 Claims, 1 Drawing Sheet

DRIVE FOR AN OPTICAL INFORMATION RECORDING MEDIUM

This is a continuation of application Ser. No. 794,866 filed Nov. 19, 1991, now abandoned.

BACKGROUND OF THE INVENTION

1. Field of the Invention

The present invention relates to a drive for an optical information recording medium which radiates a light beam to the optical information recording medium to record or reproduce information.

The medium used in the present invention is generally called an optical disk or a magneto-optical disk. In this type of disk, a light beam is radiated to the medium and a magnetic field may be directly applied thereto as required to record, reproduce or erase information. Such an optical information recording medium includes a read-only type, write-once type, over-write type and phase change type. The shape of the medium includes a disk shape and a card shape.

2. Related Background Art

FIG. 2 shows a sectional view of a prior art drive (optical disk drive) for an optical information recording medium.

A body 1 has a front panel having a cooling air inlet port 11 and a medium insertion port 2a, and a fan 10. An openable door 3 is attached to the medium insertion port 2a.

A loading mechanism (not shown) for loading an optical disk 9 to a predetermined position, a spindle motor 6 for driving the optical disk 9 and an optical head 7 which radiates a light beam to the optical disk 9 and is movable radially of the optical disk 9 are mounted in the body 1. The spindle motor 6 and the optical head 7 are mounted on a mount table 12.

An operation to load the optical disk 9 into the body 1 of the optical disk drive will now be explained.

A cartridge (not shown) which accommodates the optical disk 9 therein is pushed to the openable door 3 through the medium insertion port 2a formed in the front panel 2 which is a console panel of the optical disk drive.

The door 3 is pivotable in a direction S by a pushing force of the cartridge. Thus, the cartridge causes the door 3 to pivot in the direction S and is fed into the body 1 through the medium insertion port 2a.

In other than the loading mode or unloading to load or unload the cartridge, the door 3 is urged to the front panel 2 by a resilient member (not shown) to close the medium insertion port 2a or the door 3 closes the opening of the medium insertion port 2a by contacting the cartridge.

The optical disk 9 accommodated in the cartridge is guided to a predetermined position on the spindle motor 6 by the loading mechanism. In this manner, the optical disk drive is ready to operate.

In the unloading mode of the optical disk 9, the loading mechanism also unloads the cartridge from the medium insertion port 2a by the reverse operation to that in the loading of the optical disk 9. In the unloading mode of the cartridge, the door 3 is pivoted in the direction S by a mechanism (not shown) in association with the unloading of the cartridge.

When information is to be recorded on the optical disk 9, the spindle motor 6 is driven to rotate the optical disk 9. The optical head 7 is moved to a predetermined position relative to the optical disk 9 and a light beam is radiated in accordance with the information to be recorded.

Various components of the optical disk drive are mounted in the drive. Among them, an electrical circuit board 5 which mounts an electrical circuit is included. The electrical circuit board is a typical example of a heat source which generates a large amount of heat as the drive is operated. The heat source includes other components than the electrical circuit board. Because of such heat source, the temperature in the drive rises during the operation of the drive and the electrical circuit may be broken thereby.

Thus, as cooling means for the heat source, the cooling air inlet port 11 is provided in the front panel 2 and the fan 10 is provided in a rear side of the body 1. Cooling air is taken in from the cooling air inlet port 11 to cool the heat source such as the electrical circuit board 5 and the air used to cool the heat source is ejected from the body 1 by the fan 10. The fan 10 is driven by drive means such as a motor (not shown).

The mount table is fixed to the body 1 by shock absorbing rubber buffering member 13. It is preferable to use a shock absorber such as rubber to fix the mount table 12 to the body 1, in order to prevent vibration externally imparted to the body 1 from being propagated to the mount table 12. If the vibration is propagated to the mount table 12, the vibration is also propagated to the optical head 7, the spindle motor 6 on the mount table 12 and the optical disk 9. This adversely affects the tracking and focusing operations and disturbs the recording and reproducing operation for the optical disk 9.

As described above, in the optical disk drive, the cooling air taken in from the cooling air inlet port 11 not only moves toward the electrical circuit board 5 but also moves toward the optical disk 9 and the optical head 7. As a result, dust contained in the cooling air is deposited on the optical disk 9 and an objective lens of the optical head 7. The same is true for dust entered from gaps of the body. The longer the drive is operated, the more the amount of cooling air taken in the drive increases and the more the amount of deposition of dust increases.

Further, dust deposited on the shock absorbing rubber 13 may float into the disk as the shock absorbing rubber 13 is moved by vibration.

As a result, during the operation of the drive, a tracking error may take place by the influence of the dust, or a portion of the optical disk 9 which is irradiated by the light beam through the objective lens may not rise to a predetermined temperature. Consequently, the writing or reading of data to or from the optical disk 9 is not attained.

In order to solve the problem caused by dust, a proposal has been made to construct the body of the drive to be sealed when the door of the optical disk insertion port is closed. This method prevents the entry of the dust but does not permit taking in external air to cool the heat source. As a result, the heat source such as the electrical circuit board is not sufficiently cooled and the temperature in the drive rises by the heat generated by the heat source, and the electrical circuit board or the optical disk may be damaged.

It has also been proposed to use a sealable member to fix the mount table 12 to seal the gaps between the optical head 7 and the optical disk 9, and the heat source. In this method, however, external vibration is propagated to the optical head 7 and the optical disk 9 and the problem described above is encountered.

SUMMARY OF THE INVENTION

It is an object of the present invention to provide a drive for an optical information recording medium which prevents entry of external dust without reducing a cooling function to a component to be cooled such as an electrical circuit board.

The drive for the optical information recording medium of the present invention comprises a medium holder for holding the optical information recording medium; drive means for rotating the medium; a movable optical head for radiating a light beam to the medium; a body having the drive means and the optical head built therein; a cooling air inlet port formed in the body; a fan mounted in the body for venting the interior of the body; and a sealed box provided in the body and having a medium insertion area with a door. The box accommodates no heat generating component of the drive and accommodates at least the medium holder and the optical head.

In accordance with the present invention, a unit for holding the optical information recording medium and the optical head are built in the body of the drive for the optical information recording medium, and a sealed box having a medium insertion port is provided in the body. Thus, the cooling air taken in from the exterior of the drive and the air flowing in from gaps of the body of the drive are blocked so that they do not flow into the sealed box.

The components to be cooled such as the electrical circuit board which is the heat source, and the cooling means such as the fan are mounted externally of the sealed box.

Thus, when the cooling air is taken in to cool the components to be cooled, the deposition of the dust contained in the air to the optical information recording medium mounted in the box and the objective lens mounted on the optical head is minimized.

Further, since the sealed box is fixed to the body of the drive by a buffering member, external vibration imparted to the body of the drive is hardly propagated to the sealed box. Accordingly, the propagation of external vibration to the optical head and the information recording medium in the sealed box is prevented.

DETAILED DESCRIPTION OF THE PREFERRED EMBODIMENTS

Figure 1:
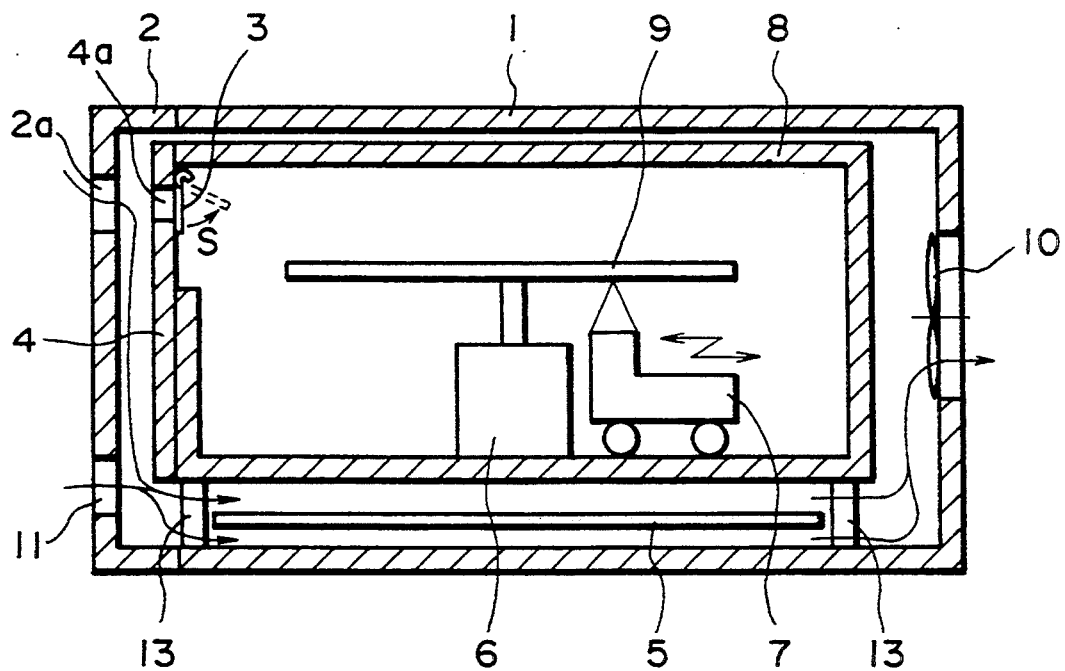
FIG. 1 shows a sectional view of one embodiment of a drive for an optical information recording medium in accordance with the present invention.
Figure 2:
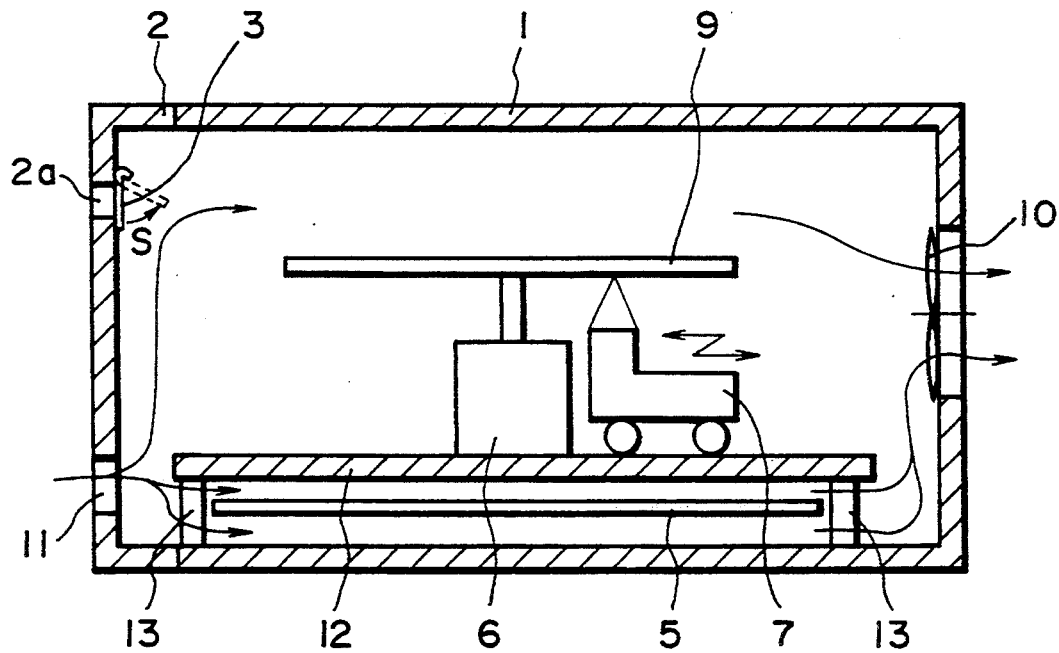
FIG. 2 shows a sectional view of a prior art drive.

FIG. 1 shows a sectional view of an embodiment of the present invention applied to an optical disk drive.

A body (main casing) 1 has a front panel 2 having a cooling air inlet port 11 and a medium insertion port 2a, and a fan 10. An optical head 7, a spindle motor 6 and a loading mechanism (not shown) are built into the body 1 and a sealed box 8 having a medium insertion area 4 is provided in the body 1.

The sealed box 8 is fixed to the body 1 by a shock absorbing rubber buffering member 13. Where a bottom plane of the sealed box 8 is rectangular, it is preferable to fix four corners of the rectangle to the body 1 by a shock absorbing rubber buffering member 13.

An electrical circuit board 5 which is a heat source is mounted externally of the sealed box 8.

The medium insertion area 4 has a second medium insertion port 4a. An openable door 3 is attached to the second medium insertion port 4a.

An operation to load the optical disk 9 into the optical disk drive will now be explained.

A cartridge (not shown) which accommodates the optical disk 9 is inserted through the medium insertion port 2a formed in the front panel 2 which is a console panel of the optical disk drive, and the second medium insertion port 4a formed in the medium insertion area 4. The cartridge is pushed to the openable door 3 attached to the second medium insertion port 4a.

The door 3 is pivotable in the direction S by a mechanism (not shown) as it is in the prior art drive. Thus, the cartridge causes the door 3 to pivot in the direction S and is fed into the box 8 through the second medium insertion port 4a.

The optical disk 9 accommodated in the inserted cartridge is guided to a predetermined position on the spindle motor 6 by the loading mechanism (not shown) and mounted thereon.

In the unloading mode of the optical disk 9, the loading mechanism makes the reverse operation to that in the loading mode to take out the cartridge which accommodates the optical disk 9 therein from the medium insertion port 2a. In the unloading mode of the cartridge, the door 3 pivots in the direction S in association with the unloading operation of the cartridge.

When the optical disk drive is ready to operate, the door 3 attached to the second medium insertion port 4a is closed by a similar mechanism to that in the prior art drive so that the box 8 is sealed.

The components to be cooled such as the electrical circuit board 5 and the fan 10 which is the cooling means therefor are mounted externally of the box 8. As a result, the air entering from the medium insertion port 2a formed in the front panel 2 and the cooling air inlet port 11 is prevented from entering into the box 8.

Consequently, the deposition of dust on the optical disk 9 and the objective lens of the optical head 7 caused by the entry of the air containing the dust is minimized.

In the present embodiment, the sealed box 8 having the medium insertion area 4 is provided in the body 1, and the spindle motor 6, the optical head 7 and the loading mechanism (not shown) are mounted in the box 8. Alternatively, the medium insertion area 4, the spindle motor 6, the optical head 7 and the loading mechanism may form a sealed structure to attain the same effect.

The recording, reproducing and erasing of information to or from the optical disk 9 are the same as those in the prior art drive and the explanation thereof is omitted.

While the present invention is applied to an optical disk drive in the embodiment, the present invention is not limited to an optical disk drive.

In the present embodiment, the sealed box 8 is fixed to the body by the shock absorbing rubber buffering member 13, although other buffering members (which function as the shock absorbers) may be used.

What is claimed is:

1. A drive apparatus for an optical information recording medium comprising:
    a medium holder for holding the optical information recording medium;

drive means for rotating the medium held by the medium holder;

a movable optical head for radiating a light beam to the medium;

a main casing having a medium insertion opening through which the medium is inserted from the exterior of the main casing;

means for moving cooling air in the main casing for ventilating the interior of the main casing; and a box supported in the main casing and having a medium insertion opening located so that the medium may be inserted through the medium insertion opening of the main casing and through the medium insertion opening of the box sequentially, the box having fixed walls which surround the interior of the box and having means including the walls and a door which opens and closes the medium insertion opening of the box for sealing the box and isolating the interior of the box from the interior of the main casing when the door is closed;

wherein the medium holder and the optical head are located in the interior of the box and the drive apparatus includes heat-generating components located exteriorly of the box and interiorly of the main casing, whereby when the medium is held on the medium holder after insertion through the medium insertion openings of the main casing and the box and the medium insertion opening of the box is closed, the interior of the box is isolated from the cooling air and from dust which may be carried by the cooling air.

2. A drive apparatus according to claim 1, wherein the sealing means includes means for keeping the door closed except during insertion and removal of the medium through the medium insertion opening of the box.

3. A drive apparatus according to claim 1, wherein the box is supported in the main casing by shock absorbing means for preventing vibration imparted to the main casing from being propagated to the box.

* * * * *